United States Patent
Knipfer et al.

(10) Patent No.: US 8,290,606 B2
(45) Date of Patent: Oct. 16, 2012

(54) CONTROLLED CANCELLATION FOR PRODUCTION FLOW AND PHYSICAL ASSETS

(75) Inventors: Ivory W. Knipfer, Rochester, MN (US); Matthew H. Zemke, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 642 days.

(21) Appl. No.: 12/130,965

(22) Filed: May 30, 2008

(65) Prior Publication Data

US 2009/0299508 A1 Dec. 3, 2009

(51) Int. Cl.
- *G06F 19/00* (2006.01)
- *G06F 17/00* (2006.01)
- *G06Q 10/00* (2006.01)
- *G06Q 50/00* (2006.01)
- *A01K 5/02* (2006.01)
- *G06G 7/00* (2006.01)
- *G06Q 90/00* (2006.01)

(52) U.S. Cl. .............. 700/95; 700/97; 700/100; 700/99; 700/105; 705/300; 705/400; 705/500; 705/6; 705/29; 705/28

(58) Field of Classification Search ............ 700/95, 700/97, 99, 100, 105; 705/28, 7, 300, 400, 705/500, 6, 29, 7.12, 7.23, 7.25
See application file for complete search history.

(56) References Cited

U.S. PATENT DOCUMENTS 5,040,123 A * 8/1991 Barber et al. ............ 700/100

(Continued)

OTHER PUBLICATIONS

Cohen et al.; "Measuring Imputed Cost in the Semiconductor Equipment Supply Chain"; Management and Science; vol. 49; No. 12; pp. 1653-1670; 2003.

(Continued)

*Primary Examiner* — Charles Kasenge
*Assistant Examiner* — Jason Lin
(74) *Attorney, Agent, or Firm* — Steven M. Greenberg, Esq.; Carey, Rodriguez, Greenberg & O'Keefe (57) ABSTRACT

Embodiments of the present invention provide a method, system and computer program product for controlling cancelled orders in a manufacturing environment. In an embodiment of the invention, a method for controlling cancelled orders in a manufacturing environment can be provided. The method can include receiving a cancellation of an order in the manufacturing environment, reading a list of work units associated with the order, obtaining at least one identifying attribute of each work unit in the list of work units associated with the order, reading a space maximum value associated with at least one identifying attribute of each work unit in the list of work units associated with the order, reading a stock maximum value associated with the at least one identifying attribute of each work unit in the list of work units associated with the order, determining a current stock value associated with at least one identifying attribute of a first work unit in the list of work units associated with the order, and if the current stock value is less than the space maximum value and the stock maximum value, setting a valid cancel optimization status indicator of the first work unit. The method can further include retrieving a cancel optimization model record matching the at least one identifying attribute of the first work unit, and can include applying the retrieved optimization model record to the first work unit to modify a process routing map of the first work unit.

14 Claims, 6 Drawing Sheets

U.S. PATENT DOCUMENTS

| | | | |
|---|---|---|---|
| 5,495,417 A | | 2/1996 | Fuduka et al. |
| 5,694,325 A | | 12/1997 | Fukuda et al. |
| 6,049,775 A | * | 4/2000 | Gertner et al. ............... 705/8 |
| 2003/0055753 A1 | * | 3/2003 | Dellar et al. ............... 705/29 |
| 2003/0130863 A1 | * | 7/2003 | Grey et al. ............... 705/1 |
| 2003/0149631 A1 | * | 8/2003 | Crampton et al. ............... 705/22 |
| 2004/0210467 A1 | * | 10/2004 | Yokoyama ............... 705/8 |
| 2004/0236645 A1 | * | 11/2004 | Tien ............... 705/28 |
| 2005/0027621 A1 | * | 2/2005 | Ramakrishnan ............... 705/28 |
| 2005/0261947 A1 | * | 11/2005 | Alam et al. ............... 705/8 |
| 2006/0085450 A1 | * | 4/2006 | Seubert et al. ............... 707/100 |
| 2006/0212323 A1 | * | 9/2006 | Ninomiya ............... 705/7 |
| 2008/0120129 A1 | * | 5/2008 | Seubert et al. ............... 705/1 |
| 2008/0147490 A1 | * | 6/2008 | Najmi et al. ............... 705/10 |
| 2009/0063305 A1 | * | 3/2009 | Kreifels et al. ............... 705/28 |
| 2009/0143887 A1 | * | 6/2009 | Jones ............... 700/99 |

OTHER PUBLICATIONS

Xu; "Multi-Period Dynamic Supply Contracts with Cancellation"; School of Civil and Environmental Engineering; Cornell University; 2005.

Chong et al.; "Simulation-Based Scheduling for Dynamic Discrete Manufacturing"; Winter Simulation Conference; 2003.

Bosch; "Software Product Lines: Organizational Alternatives"; University of Groningen; Department of Computing Science; IEEE; 2001.

Dangelmaier et al.; "A Two-Tier Method for Evaluating Alternative Policies to Support Interactive Analysis of 3D Material Flow Simulations"; Winter Simulation Conference; 2005.

Umeda et al.; "Design Specifications of a Generic Supply Chain Simulator"; Winter Simulation Conference; 2004.

* cited by examiner

CANCEL OPTIMIZATION MODELS 310

| Priority | Product Line | Product ID | BOM | Part | Min Operation | Max Operation | Min Test Complete | Part % Install | Last Operation | Stock Location |
|---|---|---|---|---|---|---|---|---|---|---|
| 1 | *ALL | 1.8M Rack | *ALL | *ALL | Rack Build | Rack Build | 0% | 50% | Rack Build | *NONE |
| 2 | *ALL | 1.8M Rack | *ALL | *ALL | Test | C&C | 50% | 90% | Test | RKSPAR |
| 1 | 1.8M RS | L4 | *ALL | *ALL | Drawer Build | Drawer Build | 0% | 95% | Test | L4SPAR |
| 1 | 1.8M RS | Sundance | *ALL | *ALL | Drawer Build | Drawer Build | 0% | 95% | Test | L4SPAR |
| 1 | *ALL | HMC | *ALL | *ALL | Test | C&C | 75% | 80% | C&C | HMC001 |
| 1 | MES9406 | DH Mantis | *ALL | *ALL | Test | Ship | 60% | 90% | HIPOT | *NONE |
| 2 | *ALL | DH Mantis | *ALL | *ALL | Drawer Build | Drawer Build | 0% | 90% | Drawer Build | *NONE |

FIG. 3

MAXIMUM CANCEL STOCK 410

| Machine Type | Model | Product ID | Space MAX QTY | Stock MAX QTY |
|---|---|---|---|---|
| 9406 | *ALL | 1.8M Rack | 20 | 20 |
| *ALL | *ALL | L4 | 40 | 70 |
| *ALL | *ALL | Sundance | 30 | 60 |
| 7310 | CR3 | HMC | 25 | 50 |
| 9406 | 570 | DH Mantis | 5 | 5 |

CONTROLLED CANCELLATION FOR PRODUCTION FLOW AND PHYSICAL ASSETS

BACKGROUND OF THE INVENTION

1. Statement of the Technical Field

The present invention relates to integrated supply chain management and more particularly to an order cancellation management system that can optimize manufacturing activity of work-in-process products by adjusting the production routing and flow for product/work units of the cancelled order.

2. Description of the Related Art

Generally, in integrated supply chain manufacturing systems, customers access an order management system to place product orders via a user interface, e.g., via a computer in communication with the Internet. Upon the generation of a valid order, a production configure-to-order (CTO) process is performed. CTO orders identify the parts or components that are needed for manufacturing of a certain product. These parts or components are stocked in various storage locations until identified and pulled for usage in the products. In today's manufacturing environment, many of the CTO orders are for one or more large complex systems. These large complex systems typically are comprised of multiple top level production units, commonly referred to as work units. The top level, e.g., parent, work units may be comprised of various subassembly, e.g., child, work units. For example, a server rack, which is a top level work unit, can include multiple drawers, which are subassembly work units, installed within the server rack. A single CTO order can include multiple server racks and/or other work units.

In order to fulfill a CTO order, various pieces (e.g., work units) of the order will flow through production during manufacturing. In this sense, multiple parallel production lines can operate simultaneously to produce various work units of the CTO order. The time for producing the various work units will vary during the production cycle. In other words, various work units will be in various stages of completeness or progress at different points in the production process. For example some work units can be completely assembled but not tested. Other work units can have some subassembly work units that are assembled and tested and other subassembly work units that have yet to commence assembly.

One issue that arises in the modern manufacturing environment is how to effectively handle an order cancellation to preserve manufacturing value-added production already performed on the cancelled order. Currently, when the cancellation of an order occurs, the standard industry practice is to halt all activity on that cancelled order. Afterward, a manual decision regarding how to dispense with the in-process order is made. Typically, the decision is to: 1) tear down the order into parts or 2) reapply to a new order. Other manufacturers permit one additional decision, which is to allow an entire system to progress to a certain stage of the manufacturing process. The problem with any of these options is that an order is made up of several pieces (e.g., work units) and each of these pieces (e.g., work units) will have a different status (or measurement of progress) in the manufacturing process. Each of these industry practices results in significant inefficiencies. Decisions to tear down are inefficient as all manufacturing value-added work will be lost on those parts (e.g., work units) of the system that are near completion. Decisions to reapply have similar negative implications. Finally, decisions allowing an entire system to proceed require that an entire system be assembled and then allowed to progress to a completion stage. The decision allowing an entire system to proceed results in the addition of excessive manufacturing activity, particularly with respect to those work units of the system for which assembly has not yet commenced.

SUMMARY OF THE INVENTION

Embodiments of the present invention address deficiencies of the art in respect to loss of invested manufacturing activity on cancelled work-in-process system orders and provide a novel and non-obvious method, system and computer program product for controlling cancelled orders in a manufacturing environment. In an embodiment of the invention, a method for controlling cancelled orders in a manufacturing environment can be provided. The method can include receiving a cancellation of an order in the manufacturing environment, reading a list of work units associated with the order, obtaining at least one identifying attribute of each work unit in the list of work units associated with the order, reading a space maximum value associated with at least one identifying attribute of each work unit in the list of work units associated with the order, reading a stock maximum value associated with the at least one identifying attribute of each work unit in the list of work units associated with the order, determining a current stock value associated with at least one identifying attribute of a first work unit in the list of work units associated with the order, and if the current stock value is less than the space maximum value and the stock maximum value, setting a valid cancel optimization status indicator of the first work unit.

In one aspect of the embodiment, the method can further include retrieving a cancel optimization model record matching the at least one identifying attribute of the first work unit, and can include applying the retrieved optimization model record to the first work unit to modify a process routing map of the first work unit.

In another aspect of the embodiment, the method yet further can include determining the first work unit is a parent work unit, reading a list of child work units installed in the parent work unit, obtaining at least one identifying attribute for each child work unit installed in the parent work unit, reading a stock maximum value associated with the at least one identifying attribute of each child work unit, determining a current child stock value associated with the at least one identifying attribute of each child work unit and if the current child stock value for each child work unit is less than the associated stock maximum value for each child work unit, retrieving a cancel optimization model record matching the at least one identifying attribute of the parent work unit.

In another preferred embodiment of the invention, a system for controlling cancelled orders in a manufacturing environment can be provided. The system can include a data store of work unit routings and cancel optimization management rules and data. The system further can include a process adjustment for cancel optimization engine communicatively coupled to a manufacturing system and the data store. The system further can include cancelled order process adjustment logic. The logic can include program code enabled to receive a cancellation of an order in the manufacturing environment, to read a list of work units associated with the order, to obtain at least one identifying attribute of each work unit in the list of work units associated with the order, to read a space maximum value associated with at least one identifying attribute of each work unit in the list of work units associated with the order, to read a stock maximum value associated with the at least one identifying attribute of each work unit in the list of work units associated with the order, to determine a current stock value associated with at least one identifying attribute of a first work unit in the list of work units associated with the order, and if the current stock value is less than the space maximum value and the stock maximum value, to set a valid cancel optimization status indicator of the first work unit.

In one aspect of the embodiment, the logic further can include program code enabled to retrieve a cancel optimization model record matching the at least one identifying attribute of the first work unit and to apply the retrieved optimization model record to the first work unit to modify a process routing map of the first work unit.

In another aspect of the embodiment, the logic yet further can include program code enabled to determine the first work unit is a parent work unit, to read a list of child work units installed in the parent work unit, to obtain at least one identifying attribute for each child work unit installed in the parent work unit, to read a stock maximum value associated with the at least one identifying attribute of each child work unit, to determine a current child stock value associated with the at least one identifying attribute of each child work unit and if the current child stock value for each child work unit is less than the stock maximum value for each child work unit, to retrieve a cancel optimization model record matching the at least one identifying attribute of the parent work unit.

In yet another preferred embodiment of the invention, a computer program product comprising a computer usable medium embodying computer usable program code for controlling cancelled orders in a manufacturing environment can be provided. The computer program product includes computer usable program code for receiving a cancellation of an order in the manufacturing environment, reading a list of work units associated with the order, obtaining at least one identifying attribute of each work unit in the list of work units associated with the order, reading a space maximum value associated with at least one identifying attribute of each work unit in the list of work units associated with the order, reading a stock maximum value associated with the at least one identifying attribute of each work unit in the list of work units associated with the order, determining a current stock value associated with at least one identifying attribute of a first work unit in the list of work units associated with the order, and if the current stock value is less than the space maximum value and the stock maximum value, setting a valid cancel optimization status indicator of the first work unit.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention address deficiencies of the art in respect to loss of invested manufacturing activity on cancelled work-in-process system orders and provide a novel and non-obvious method, system and computer program product for controlling cancelled orders in a manufacturing environment. In accordance with an embodiment of the present invention, a set of cancel optimization strategies or models and a set of user-defined maximum cancel stock attributes for use in the manufacturing environment can be defined. An order cancel request can be received in the manufacturing area and a list of top level work units, e.g., products, for a manufacturing order can be read. At least one identifying attribute of a first work unit identified in the list of top level work units can be obtained and used to read or retrieve a space maximum quantity value associated with the at least one identifying attribute of the first work unit. In addition, the at least one identifying attribute of the first work unit identified in the list of top level work units can be used to read or retrieve a stock maximum quantity value associated with the at least one identifying attribute of the first work unit. A current stock value associated with the at least one identifying attribute of the first work unit can be determined and compared to the space maximum quantity value and the stock maximum value. If the current stock value is less than the space maximum value and the stock maximum value then a valid cancel optimization status indicator can be set for the first work unit. If the valid cancel optimization status indicator is set for the first work unit, then a search of the cancel optimization data store can be performed and any records matching the at least one identifying attribute of the first work unit can be read and sorted by priority value. In turn, the highest priority cancel optimization model record can be selected and applied to the attributes or characteristics of the first work unit. If the attributes or characteristics of the highest priority cancel optimization model record do not match the attributes or characteristics of the product/work unit, the next highest priority cancel optimization model record can be selected and applied. This process continues until either a matching cancel optimization model is identified or no cancel optimization model records remain. In this way, the manufacturing value-added production can be analyzed or weighted in terms of process, test and/or parts installed. In another aspect of the embodiment, the method further can include determining the first work unit is a parent work unit, reading a list of child work units installed in the parent work unit, obtaining at least one identifying attribute for each child work unit installed in the parent work unit, reading a stock maximum value associated with the at least one identifying attribute of each child work unit, determining a current child stock value associated with the at least one identifying attribute of each child work unit and if the current child stock value for each child work unit is less than the stock maximum value for each child work unit, retrieving a cancel optimization model record matching the at least one identifying attribute of the parent work unit.

In accordance with another embodiment of the present invention, a system to create new methods, models and set of algorithms for controlling cancelled orders in a manufacturing environment a data store of work unit routings and cancel optimization management rules and data. The system can include a process adjustment for cancel optimization engine and cancelled order process adjustment logic. The logic can include program code enabled to receive a cancellation of an order in the manufacturing environment, to read a list of work units associated with the order, to obtain at least one identifying attribute of each work unit in the list of work units associated with the order, to read a space maximum value associated with the at least one identifying attribute of each work unit in the list of work units associated with the order, to read a stock maximum value associated with the at least one identifying attribute of each work unit in the list of work units associated with the order, to determine a current stock value associated with at least one identifying attribute of a first work unit, and if the current stock value is less than the space maximum value and the stock maximum value, to set a valid cancel optimization status indicator for the first work unit. The cancel optimization models allow for an automated and dynamic method to preserve manufacturing value-added production already performed on a product/work unit by product/work unit basis.

Figure 1:
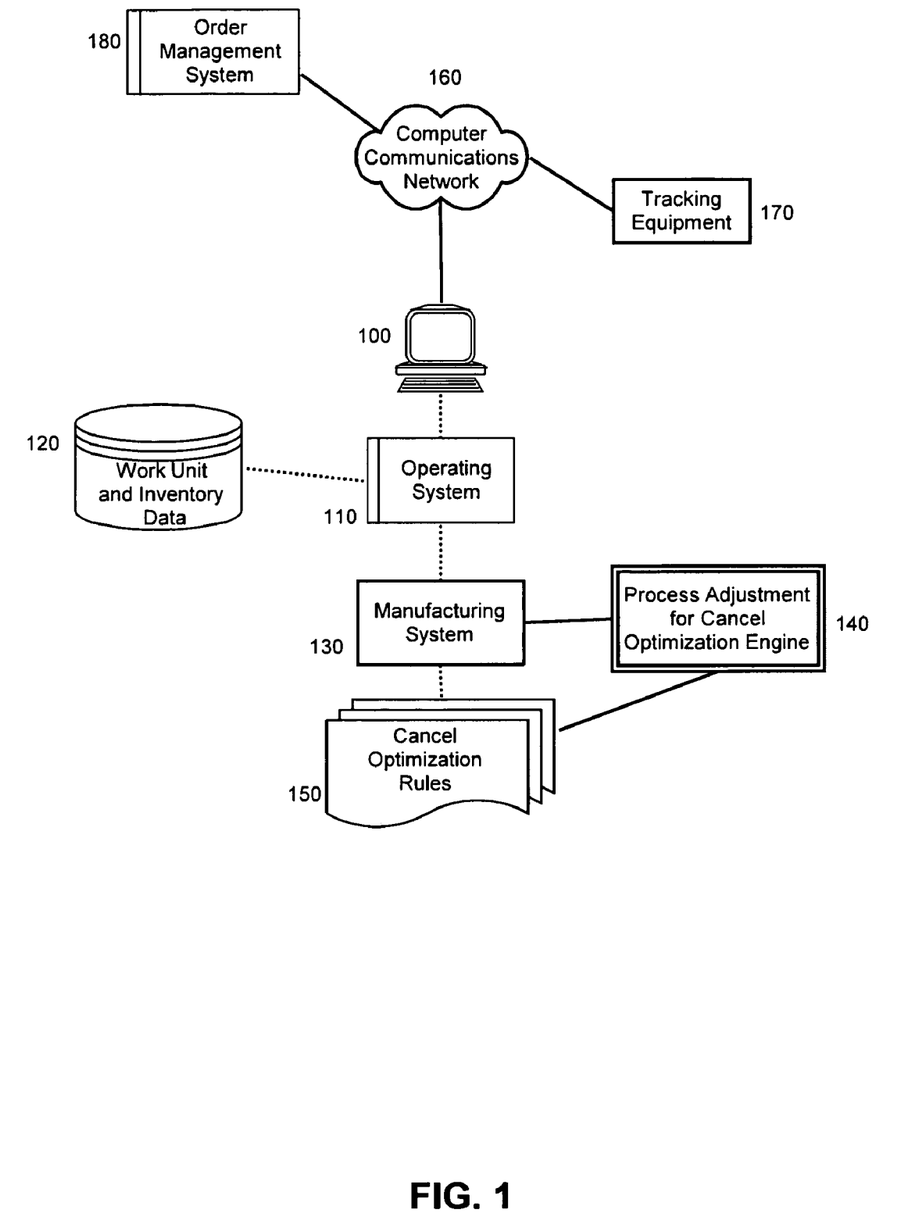
FIG. 1 is a schematic illustration of a manufacturing system utilizing a process adjustment for cancel optimization engine.

In illustration, FIG. 1 is a schematic illustration of a manufacturing system utilizing a process adjustment for cancel optimization. A computer 100 with an operating system 110 can be coupled to a database 120 of product management data including production configure-to-order (CTO) record information, work unit attributes, stocked or staged (e.g., "loc'ed") data, cancel optimization models and/or maximum cancel stock data. A manufacturing system 130 can be coupled to a process adjustment for cancel optimization engine 140. Cancel optimization management rules 150 can be coupled to the manufacturing system 130 and the process adjustment for cancel optimization engine 140. The cancel optimization management rules 150 can enable the manufacturing system 130 or the process adjustment for cancel optimization engine 140 to apply a real-time process/routing adjustment for cancel order optimization analysis to preserve value-added production already performed on a cancelled CTO order on a work unit by work unit basis. The selection of which cancel optimization model of cancel optimization rules 150 to apply can be based on numerous factors including but not limited to product line, production identification (ID), bill of materials (BOM), specific part type, level of operation progress, level of test completeness and percentage of installed parts. The computer 100 can be coupled to order management system 180 and tracking equipment 170 via computer communications network 160 for tracking work units of cancelled CTO orders.

Figure 2:
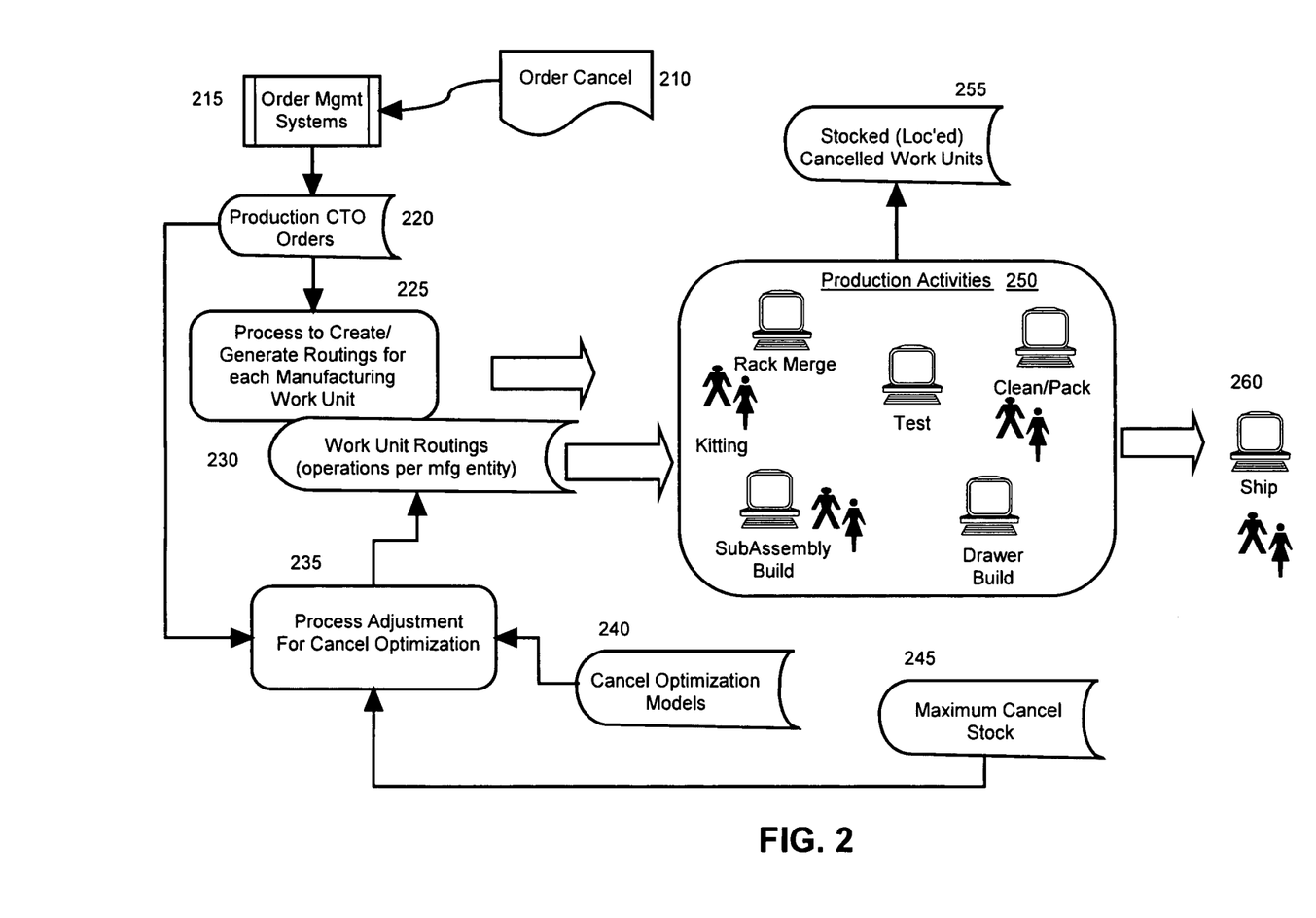
FIG. 2 is a flowchart illustrating a real-time process adjustment for cancel optimization.

In further illustration, FIG. 2 is a flowchart illustrating a real-time process adjustment for cancel optimization analysis in a manufacturing supply chain environment. In block 210, an order cancel request can be generated or issued by a business partner, customer, client or the like. In block 215, an order management system in a manufacturing environment can receive the order cancel request and determine a matching production configure-to-order (CTO) order record and retrieve the matched CTO record, which can include a listing of all top level work units (WU) and the corresponding configuration information for each associated work unit in block 220. In block 225, a process to create or generate production routings, e.g., process routing maps, for the CTO order typically occurs and each order unit, e.g., each parent work unit and child work unit can be assigned a work unit routing such as a process routing map. The work unit routing can include a complete end-to-end mapping of the manufacturing process to which a particular work unit will be subjected to while passing through manufacturing. For example, in block 250, there are illustrated various production activities or operations such as kitting of parts, subassembly build, drawer build, rack merger, test and clean/pack.

In embodiments, a manufacture entity, e.g., a server rack with assigned product identification (ID) can be assigned a work unit routing, e.g., a process routing map, which can detail the end-to-end production process for that server rack. The process routing map of the server rack can include, for example, the merge stage where child work units, e.g., drawers, are installed in the server rack, and the system test stage where various tests of the server rack can be performed. The process routing map of the server can include individual assembly routings, test routings and group routings. In block 230, the production routings, e.g., each of the work unit routings generated in block 225 can be stored in a repository 120 for retrieval and use at a later stage of production. In block 235, the process adjustment for cancel optimization engine 140 can be invoked by computer 100 or manufacturing system 130. In blocks 240 and 245, the process adjustment for cancel optimization engine 140 can include cancelled order process adjustment logic for modeling or defining a set of cancel optimization management rules in a manufacturing facility with their corresponding attributes and/or characteristics.

Additionally, in block 235, the process adjustment for cancel optimization engine 140 can include cancelled order process adjustment logic for modeling a set of cancel optimization strategies and a set of maximum cancel stock strategies based on the attributes and/or characteristics of a cancelled order product and any other user-defined parameters. The cancelled order process adjustment logic can be coupled to the process adjustment for cancel optimization engine 140 either directly as part of the computing system or remotely through an application programming interface (API) of the computing system. The cancelled order process adjustment logic can include program code enabled to analyze a cancelled order, determine the composition of products and/or work units in the cancelled order, and determine the related attributes and/or characteristics of each work unit in order to select cancel optimization strategy most responsive to a particular product affected by the cancelled order. Typically, the modeling of cancel optimization models and maximum cancel stock models will occur once, e.g., during an initialization stage of the system; however, the modeling can occur multiple times, e.g., at user-defined stages.

In an embodiment of the system, cancelled order process adjustment logic can include program code enabled to receive a cancellation of an order in the manufacturing environment, to read a list of work units associated with the order, to obtain at least one identifying attribute of a first work unit of the order, to read a space maximum value associated with the at least one identifying attribute of the first work unit, to determine a current stock value associated with the at least one identifying attribute of the first work unit, and if the current stock value is less than the space maximum value, to set a valid cancel optimization status indicator for the first work unit. The process adjustment for cancel optimization analysis is described in greater detail with reference to FIGS. 5A and 5B. Cancel optimization management rules, including cancel optimization models and maximum cancel stock attributes and/or characteristics are described in greater detail with reference to the tables of FIG. 3 and FIG. 4.

Figure 3:
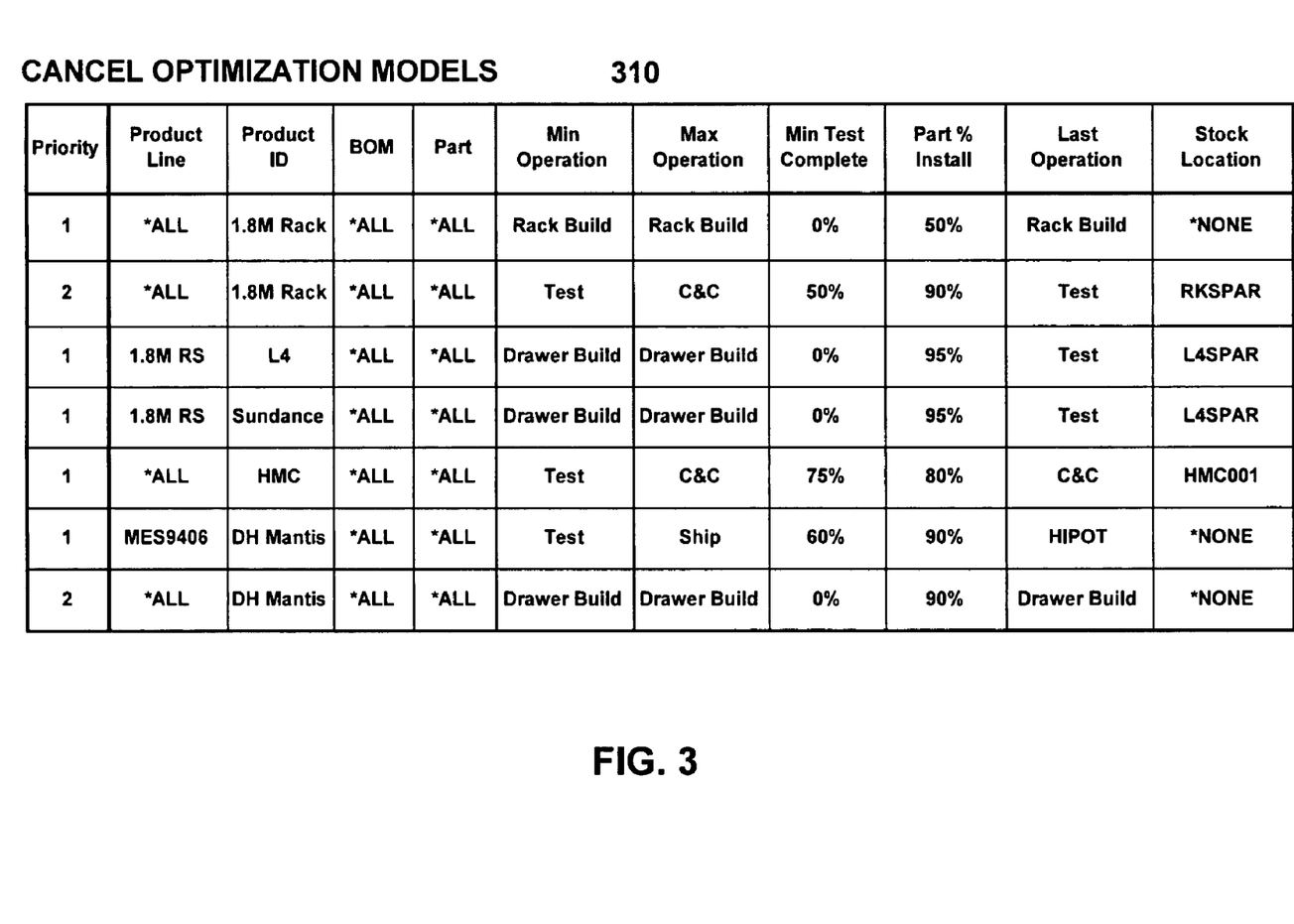
FIG. 3 is a block diagram illustrating cancel optimization models incorporated into the real-time process adjustment for cancel optimization analysis of FIG. 2.

FIG. 3 is a block diagram illustrating cancel optimization models incorporated into the real-time process adjustment for cancel optimization analysis of FIG. 2. Block 310 of FIG. 3 contains a set of cancel optimization rules and/or strategies. The cancel optimization rules 310 can be based on each product or work unit that comprises the order to be cancelled with the details of each product, which can include product line, product identification, bill of material, part identifier, minimum and maximum operation, minimum test complete, percentage part install, last operation and the like.

For example, each row of the block 310 contains the data corresponding to a cancel optimization model/strategy, while each column contains one or more values associated with a product identifier. The first column of block 310 is populated with a priority value, such as "1" and "2". The second column of block 310 is populated with the product line name, such as "1.8M RS" which is a name that identifies a particular product line having one or more of the products and/or work units identified in a cancelled order. In one embodiment, the second, third, fourth and fifth columns of block 310 indicated the product line, product ID, bill of material (BOM) and part number. The sixth and seventh columns of block 310 are populated with a minimum operation value e.g., MIN Op, and a maximum operation value e.g., MAX Op, that provide a "range" of operation for use in measuring the "progress" of a product/work unit. As such, a current level of operation for a particular product/work unit can be compared to the range of operation to determine the "progress" of a particular product/work unit and to help determine the selection of the appropriate cancel optimization model. The eighth column of block 310 is populated with a minimum test complete value, e.g., MIN Test Complete, which can be used to verify that the minimum test operations for the product/work unit where completed and to help determine the selection of the appropriate cancel optimization model. The ninth column of block 310 is populated with a part percentage install value, e.g., Part % Install, which can be used as a threshold level to help determine the selection of the appropriate cancel optimization model.

The tenth column of block 310 is populated with a last operation identifier, e.g., last Op, which can be used to modify the routing or processing of the product/work unit by setting an "end-point". In embodiments, the last operation identifier can be used to modify a current process map of a particular product/work unit by setting the last operation to be performed to the last operation identifier presented in the tenth column of block 310. For example, an "END" command can be set after the specified last Op in the process map of the particular product/work unit that currently is being analyzed or processed. In other embodiments, instead of modifying the existing process map, a new process map can be generated for the particular product/work unit. The eleventh column of block 310 is populated with stock location, which can provide a "staging" location for the particular cancelled product/work unit. In embodiments, the cancel optimization model records of block 310 work with Boolean logic that assumes "AND" positive logic only, and therefore all the attributes and/or characteristics of a given cancel optimization model record are necessary for the selection of the corresponding cancel optimization strategy. Other Boolean logic can be used to provide more complex relationships among the attributes. Although, block 310 illustrates a total of eleven attributes and/or characteristics for a given cancel optimization model record, there may be more or less attributes and/or characteristics depending on a particular business's needs or requirements. Similarly for block 410 of FIG. 4, it is contemplated that more or less columns with corresponding control and/or data parameters can be provided as necessary to execute the real-time process adjustment for cancel optimization analysis of FIG. 2.

Figure 4:
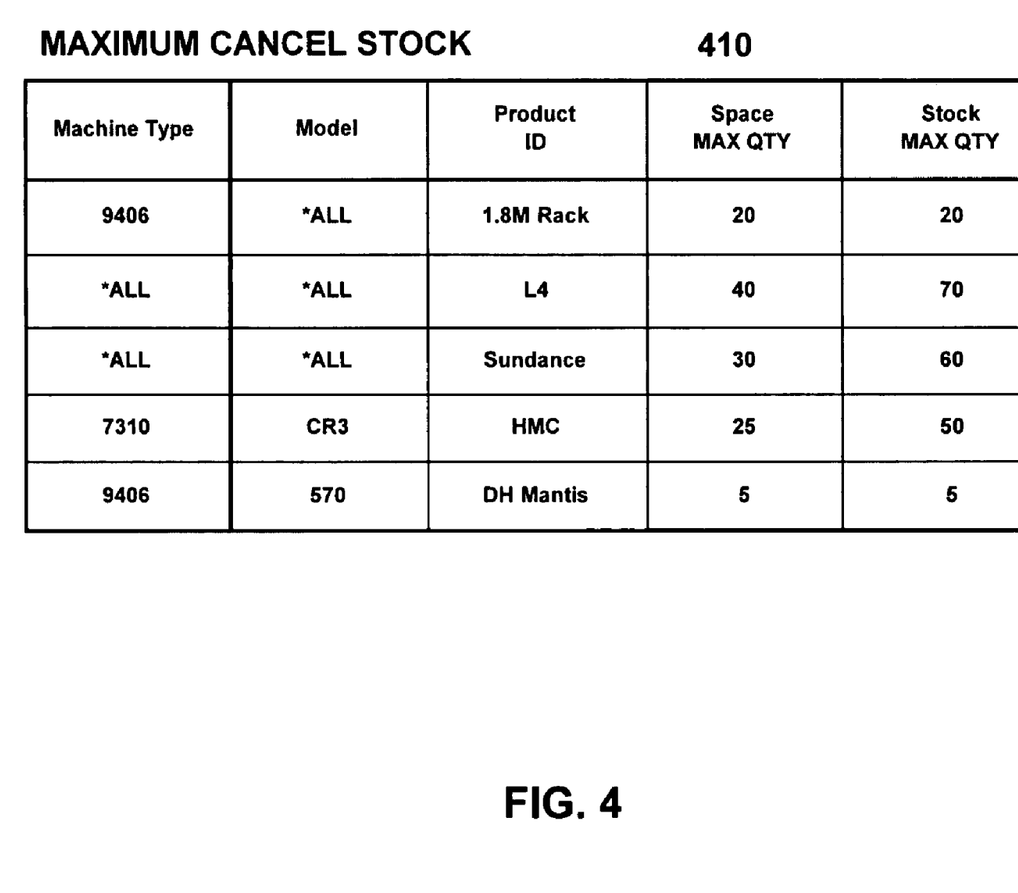
FIG. 4 is a block diagram illustrating maximum cancel stock attributes incorporated into the real-time process adjustment for cancel optimization analysis of FIG. 2.

FIG. 4 is a block diagram illustrating maximum cancel stock attributes incorporated into the real-time process adjustment for cancel optimization analysis of FIG. 2. Block 410 of FIG. 4 contains a set of maximum cancel stock rules or records. The maximum cancel stock rules 410 can be user-defined and used to set the available floor space and stock inventory quantity thresholds or values for each product or work unit. In embodiments, the first, second and third columns of block 410 indicate the machine type, model type and product identification for a product/work unit. Block 410 further can include an available floor space, e.g., space maximum quantity (Space MAX QTY), which is used to identify the maximum physical floor space that can be used by all work units of a particular type of machine/product ID/work unit. For example, as illustrated in FIG. 4, the record located in the second row has a product ID of "L4" and a Space MAX QTY of "40". In this example, the amount of storage or staging space for all work units with a product ID of "L4" is limited to 40 units. Block 410 further can include a user-defined stock maximum quantity value, e.g., Stock MAX QTY, which is used to identify the maximum number of product/work unit of a particular type of machine/product ID/work unit that can be stocked, staged, installed in other product/work units or loc'ed in the manufacturing environment. For example, as illustrated in FIG. 4, the record located in the second row has a product ID of "L4" and a Stock MAX QTY of "70". In this example, the total number of all work units with a product ID of "L4" is limited to 70 units. This means that while the quantity of standalone product/work units, e.g., those work units without other work units installed within them, for a given product/work unit type, e.g., an L4 drawer, is limited to "40" units by the Space MAX QTY of "40", there can be an additional 30 units installed in other products, e.g., the 1.8M Rack of the first row of block 410 of FIG. 4 until the Stock MAX QTY of 70 units is reached. In this example, the 1.8M Rack is the same size empty or with one or more L4 units installed inside it. Deploying both the Space MAX QTY and the Stock MAX QTY rules together, provides for management of both floor space and stock quantity even when product/work units are installed inside other product/work units, which can sometimes be referred to as "nested products".

Figure 5A:
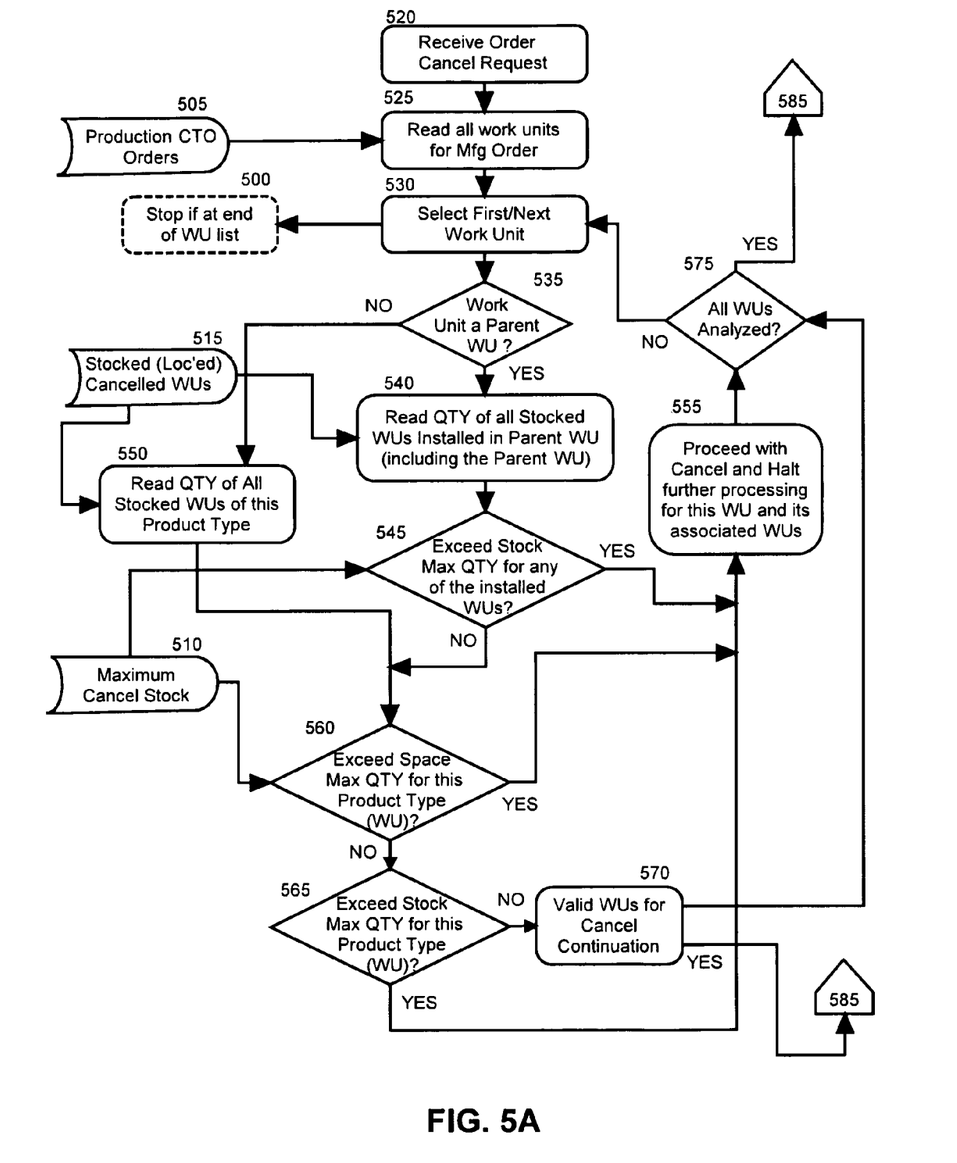
FIG. 5A is a flowchart illustrating a validity stage of a real-time process adjustment for cancel optimization process utilized by the process adjustment for cancel optimization engine of FIG. 1.

In further illustration, FIG. 5A is a flowchart illustrating a validity stage of a real-time process adjustment for cancel optimization process utilized by the process adjustment for cancel optimization engine of FIG. 1. In embodiments, the validity stage analyzes the available floor space and the quantity of each production/work unit to determine whether that particular production/work unit type is a valid candidate for cancel optimization. Beginning in block 505, a set of production CTO orders 220 in a manufacturing facility with their corresponding lists of products and/or work units can be supplied to the process adjustment for cancel optimization engine in block 525. In block 510, a set of maximum cancel stock strategies 410 with their corresponding attributes and/or characteristics can be established or modeled and supplied to the process adjustment for cancel optimization engine in block 545 and in block 560. Typically, the modeling of the maximum cancel stock strategies 410 will occur once, e.g., during an initialization stage of the system; however, the modeling can occur multiple times, e.g., at user-defined stages.

In block 515, a list of all stocked, staged and/or "loc'ed" work units, including "work-in-process" work units that were progressed due to a previous cancel action, can be provided to the process adjustment for cancel optimization engine in block 540 and in block 550. In block 520, an order cancel request can be received and all production/work units associated with the cancelled manufacturing order can be read and listed in block 525. In block 530 a first work unit can be selected from the list of production/work units associated with the cancelled manufacturing order and analyzed in decision block 535. If the selected work unit is a parent work unit, e.g., a work unit that has other work units installed in it, then in block 540, the quantity of all stocked work units installed in the parent work unit, sometimes referred to as child or sublevel work units, are read from the list of all stocked, staged and/or "loc'ed" work units, including "work-in-process" work units provided in block 515. In decision block 545, each work unit type installed in the parent can be analyzed and a determination of whether any single child work unit exceeds that particular unit's stock maximum quantity value, e.g., stock MAX QTY, can be made. In embodiments, the stock maximum quantity value can be provided in block 510 from the maximum cancel stock models. If the current stock quantity of any single child work unit type exceeds its stock MAX QTY, in block 555, the cancel operation for that parent work unit will proceed and all further processing for that parent will be halted. Otherwise, if current stock quantity of no child work unit type exceeds its stock MAX QTY, the parent work unit can proceed to decision block 560.

If, in decision block 535, the selected work unit is not a parent work unit, then in block 550, the quantity of all stocked work units of this product/work unit type, are read from the list of all stocked, staged and/or "loc'ed" work units, including "work-in-process" work units provided in block 515. In decision block 560, each product/work unit type can be analyzed and a determination of that particular unit's space maximum quantity value, e.g., space MAX QTY, can be made. If the current stock quantity of this product/work unit type exceeds its space MAX QTY, in block 555, the cancel operation for that product/work unit will proceed and all further processing for that product/work unit will be halted. Otherwise, if current stock quantity of product/work unit type does not exceed its space MAX QTY, in decision block 565, a determination of whether the current stock quantity of this product/work unit exceeds that particular unit's stock maximum quantity value, e.g., stock MAX QTY, can be made. If the current stock quantity of this product/work unit type exceeds its stock MAX QTY, in block 555 the cancel operation for that product/work unit will proceed and all further processing for that product/work unit will be halted. Otherwise, if the current stock quantity of this product/work unit type does not exceed its stock MAX QTY, in block 570, the product/work unit can be identified, e.g., setting a valid cancel optimization status indicator, as a valid product/work unit for continued cancel optimization processing and proceed to a weighting stage of a real-time process adjustment for cancel optimization process in block 585 of FIG. 5B.

Figure 5B:
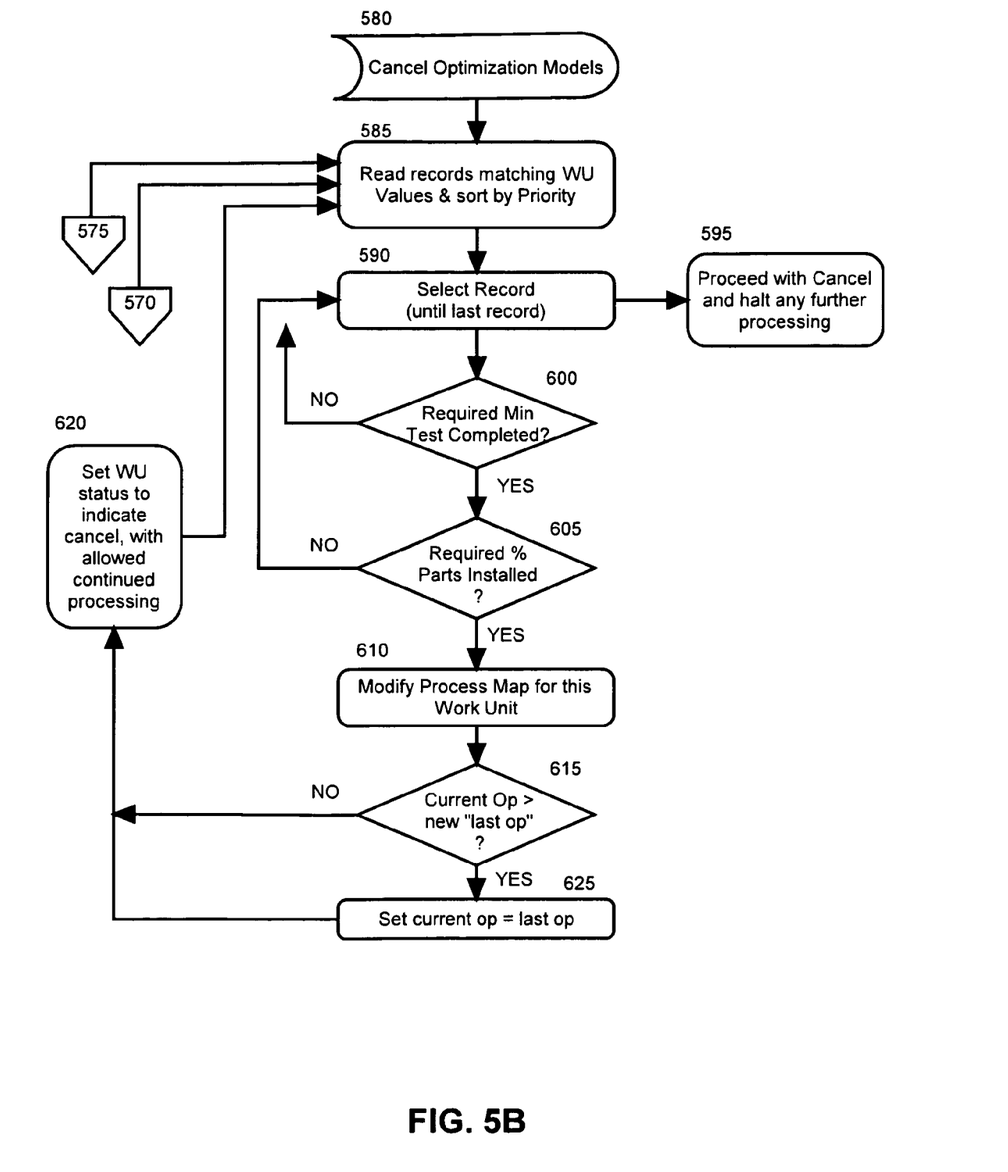
FIG. 5B is a flowchart illustrating a weighting stage of a real-time process adjustment for cancel optimization process utilized by the process adjustment for cancel optimization engine of FIG. 1.

In decision block 575, a determination if any product/work units in the cancelled manufacturing order remain to be processed, if none remain to be processed, then each product/work unit type identified as a valid product/work unit for continued cancel optimization processing in block 570 can proceed to a weighting stage of a real-time process adjustment for cancel optimization analysis in block 585 of FIG. 5B. Otherwise, the next remaining product/work unit can be selected in block 530 and processed as described above commencing with block 535.

In still further illustration, FIG. 5B is a flowchart illustrating a weighting stage of a real-time process adjustment for cancel optimization process utilized by the process adjustment for cancel optimization engine of FIG. 1. Beginning in block 580, a set of cancel optimization strategies or models 310 can be defined as previously described with reference to FIG. 3 and retrieved. In block 585, the each cancel model record that matches all identifying attributes of a product/work unit, e.g., product line, production ID, BOM and part number, and that have a current operation between the minimum operation value, e.g., MIN Op and maximum operation value, e.g., MAX Op can be read or retrieved. In this embodiment, the cancel optimization model records of block 310 operate with Boolean logic that assumes "AND" positive logic only, and therefore all the attributes and/or characteristics of a given cancel optimization model record are necessary for the selection of the corresponding cancel optimization strategy. The product/work unit also can include a valid cancel optimization status indicator as previously described in block 570 of FIG. 5A. Once all matching cancel model records are read, these matching cancel model records can be sorted by a priority value associated with the respective matching cancel model record as illustrated in the first column of block 310. Thereafter, the first matching cancel model record can be selected and the process adjustment for cancel optimization engine 140 can be invoked in block 590. If no matching cancel model record is retrieved or if all the retrieved matching cancel model records do not meet the minimum test complete threshold and/or part percentage installed threshold, then in block 595, the process can be to proceed with the cancel and halt further processing of the product/work unit and any associated work units, e.g., work units installed within the product/work unit.

Alternatively, or in addition to, in block 585, the cancel optimization model records that match at least one identifying attribute of a product/work unit, e.g., product line, production ID, BOM and part number, and that have a current operation between the MIN Op and the MAX Op can be read or retrieved. It is contemplated that other Boolean logic can be used to provide more complex relationships among the attributes.

In decision block 600, the current test complete percentage for the product/work unit can be determined and compared to a minimum test complete threshold, e.g., a Min Test Complete value. If the current test complete percentage for the product/work unit exceeds the minimum test complete threshold, e.g., a Min Test Complete value of 50%, then in decision block 605, the current percentage of parts installed in the product/work unit, can be determined and compared to the required percentage of parts installed threshold value, e.g., Part % Install. Otherwise, if the current test complete percentage for the product/work unit does not exceed the minimum test complete threshold, then the process can return to block 590 where the next matching cancel model record is retrieved. If the current percentage of parts installed in the product/work unit exceeds the required percentage of parts installed threshold value, e.g., Part % Install is "90%" then in block 610, the process map for the current product/work unit can be modified to adjust its routing. Otherwise, if the current percentage of parts installed in the product/work unit does not exceed the required percentage of parts installed threshold value, the process can return to block 590 where the next matching cancel model record can be retrieved. In embodiments, the process map can be modified by setting an "END" command after the specified last operation to create a new strategic end point in the process to provide a reusable base asset. In embodiments, instead of modifying the process map of the product/work unit, a new process map could be generated for the identified product/work unit.

In decision block 615, the current operation for the product/work unit can be determined and compared to a last operation threshold value, e.g., a last Op value of "Test". For example, the current operation for the product/work unit can be "Drawer Build". In this example, the current operation of "Drawer Build" is less than the last Op value of "Test" and as such, the current operation is not modified to equal the "new" last Op of "Test" and proceeds to block 620 where a status of the product/work unit can be set to indicate it is was associated with a cancelled order, but with allowed continued processing. Otherwise, if the current operation for the product/work unit, e.g., current op value is "Ship", is greater than the last Op value, e.g., last Op value is "Test", then in block 625 the current operation is modified to equal the "new" last Op of "Test" and the process map for this product/work unit is modified, e.g., by setting the current operation to be equal to the last op of "Test", and proceeds to block 620 where a status of the product/work unit can be set to indicate it is was associated with a cancelled order, but with allowed continued processing. Upon completion of one product/work unit, the process for controlling cancelled orders in a manufacturing environment can return to block 585 where the records matching the attributes and characteristics of the next product/work unit can be read and processed.

In embodiments, in decision block 600, instead of comparing a current test complete percentage for the product/work unit to a minimum test complete threshold, e.g., a Min Test Complete value, the decision can be based on a percentage of completed operation activities, e.g., operation steps performed. Alternatively, or in addition to, the decision in decision block 600 can be based on an application call.

The present invention can be realized in hardware, software, or a combination of hardware and software. An implementation of the method and system of the present invention can be realized in a centralized fashion in one computer system or in a distributed fashion where different elements are spread across several interconnected computer systems. Any kind of computer system, or other apparatus adapted for carrying out the methods described herein, is suited to perform the functions described herein.

A typical combination of hardware and software could be a general-purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A method, using a computer hardware system, for controlling cancelled orders in a manufacturing environment, the method comprising:
    receiving, using the computer hardware system, a cancellation of an order in the manufacturing environment;
    reading, using the computer hardware system, a list of work units associated with the order;
    obtaining, using the computer hardware system, at least one identifying attribute of each work unit in the list of work units associated with the order;
    reading, using the computer hardware system, a space maximum value associated with the at least one identifying attribute of each work unit;
    reading, using the computer hardware system, a stock maximum value associated with the at least one identifying attribute of each work unit in the list of work units associated with the order;
    determining, using the computer hardware system, a current stock value associated with the at least one identifying attribute of a first work unit in the list of work units associated with the order;
    if the current stock value is less than the space maximum value and the stock maximum value, setting, using the computer hardware system, a valid cancel optimization status indicator for the first work unit;

retrieving, using the computer hardware system, a cancel optimization model record matching at least one identifying attribute of a first work unit in the list of work units associated with the order; and, applying using the computer hardware system, the retrieved optimization model record to the first work unit in the list of work units to modify a process routing map of the first work unit.

2. The method of claim 1, wherein obtaining at least one identifying attribute of each work unit in the list of work units associated with the order comprises:

obtaining a plurality of identifying attributes of each work unit in the list of work units associated with the order, wherein the plurality of identifying attributes are selected from the group consisting of product line, product identification, bill of materials and part identifier.

3. The method of claim 1, wherein applying the retrieved optimization model record to the first work unit to modify a process routing map of the first work unit comprises:

determining a current level of test completion for the first work unit; and comparing the current level of test completion to a minimum test complete value.

4. The method of claim 1, wherein applying the retrieved optimization model record to the first work unit to modify a process routing map of the first work unit comprises:

determining a current percentage of installed parts of the first work unit; and comparing the current percentage of installed parts to a minimum percentage of installed parts value.

5. The method of claim 1, wherein applying the retrieved optimization model record to the first work unit to modify a process routing map of the first work unit comprises:

determining a current percentage of operations completed for the first work unit; and comparing the current percentage of operations completed to a minimum percentage of operations complete value.

6. The method of claim 1, further comprising:

determining that a work unit in the list of work units associated with the order is a parent work unit;

reading a list of child work units associated with the parent work unit;

obtaining at least one identifying attribute for each child work unit installed in the parent work unit;

reading a stock maximum value associated with the at least one identifying attribute for each child work unit;

determining a current child stock value associated with the at least one identifying attribute for each child work unit; and, if the current child stock value for each child work unit is less than the stock maximum value for each child work unit, setting a valid cancel optimization status indicator for the parent work unit.

7. The method of claim 6, further comprising:

retrieving a cancel optimization model record matching the at least one identifying attribute of the parent work unit.

8. A system for controlling cancelled orders in a manufacturing environment, the system comprising:

a data storage device configured to store work unit routings and cancel optimization rules;

an process adjustment for cancel optimization engine, executing as a processor of a computer hardware system, the process adjustment for cancel optimization engine communicatively coupled to a manufacturing system and the data storage device; and cancelled order process adjustment logic comprising program code, when executed on the processor of the computer hardware system, causes the process adjustment for cancel optimization engine to receive a cancellation of an order in the manufacturing environment, to read a list of work units associated with the order, to obtain at least one identifying attribute of each work unit in the list of work units associated with the order, to read a space maximum value associated with the at least one identifying attribute of each work unit in the list of work units associated with the order, to read a stock maximum value associated with the at least one identifying attribute of each work unit in the list of work units associated with the order, to determine a current stock value associated with at least one identifying attribute of a first work unit, if the current stock value is less than the space maximum value and the stock maximum value, to set a valid cancel optimization status indicator for the first work unit, to retrieve a cancel optimization model record matching at least one identifying attribute of a first work unit in the list of work units associated with the order and to apply the retrieved optimization model record to the first work unit to modify a process routing map of the first work unit.

9. The system of claim 8, wherein the system for controlling cancelled orders in a manufacturing environment is further configured to retrieve a cancel optimization model record matching at least one identifying attribute of a first work unit in the list of work units associated with the order and to obtain a plurality of identifying attributes of each work unit in the list of work units associated with the order, wherein the plurality of identifying attributes are selected from the group consisting of product line, product identification, bill of materials and part identifier.

10. The system of claim 8, wherein the system for controlling cancelled orders in a manufacturing environment is further configured to determine a current level of test completion for the first work unit, and compare the current level of test completion to a minimum test complete value.

11. The system of claim 8, wherein the system for controlling cancelled orders in a manufacturing environment is further configured to determine a current percentage of installed parts of the first work unit, and compare the current percentage of installed parts to a minimum percentage of installed parts value.

12. A computer program product comprising a computer usable storage medium having stored therein computer usable program code for controlling cancelled orders in a manufacturing environment, the computer usable program code, which when executed on a computer hardware system, causes the computer hardware system to perform:

receiving a cancellation of an order in the manufacturing environment;

reading a list of work units associated with the order;

obtaining at least one identifying attribute of each work unit in the list of work units associated with the order;

reading a space maximum value associated with the at least one identifying attribute of each work unit in the list of work units associated with the order;

reading a stock maximum value associated with the at least one identifying attribute of each work unit in the list of work units associated with the order determining a current stock value associated with at least one identifying attribute of a first work unit;

setting a valid cancel optimization status indicator for the first work unit conditioned upon the current stock value being less than the space maximum value and the stock maximum value;

retrieving a cancel optimization model record matching at least one identifying attribute of a first work unit in the list of work units associated with the order; and, applying the retrieved optimization model record to the first work unit in the list of work units to modify a process routing map of the first work unit.

13. The computer program product of claim 12, wherein computer usable program code further causes the computer hardware system to perform obtaining a plurality of identifying attributes of a first work unit in the list of work units associated with the order, wherein the plurality of identifying attributes are selected from the group consisting of product line, product identification, bill of materials and part identifier.

14. The computer program product of claim 12, wherein the computer usable program code further causes the computer hardware system to perform determining a current level of test completion for the first work unit; and comparing the current level of test completion to a minimum test complete value.

* * * * *